United States Patent [19]

Suzuki et al.

[11] 4,173,888
[45] Nov. 13, 1979

[54] PEAK POINT DETECTOR FOR IONIZED MASS FLOW RATE MEASUREMENT

[75] Inventors: Suzuo Suzuki, Yokosuka; Hiroyuki Maruoka, Yokohama; Setsuzo Tachibana, Yokosuka; Yuji Matsubara, Yokohama; Hatsuo Nagaishi, Yokosuka, all of Japan

[73] Assignee: Nissan Motor Company, Limited, Yokohama City, Japan

[21] Appl. No.: 869,245

[22] Filed: Jan. 13, 1978

[30] Foreign Application Priority Data

Jan. 14, 1977 [JP] Japan .................................... 52/3337

[51] Int. Cl.² .............................................. G01F 1/56
[52] U.S. Cl. ................................. 73/194 F; 73/194 E
[58] Field of Search ............. 73/194 A, 194 E, 194 F, 73/194 M, 597

[56] References Cited
U.S. PATENT DOCUMENTS

| | | | |
|---|---|---|---|
| 3,019,647 | 2/1962 | Beard et al. | 73/194 E X |
| 3,302,446 | 2/1967 | Schmitt et al. | 73/194 E X |
| 3,600,955 | 8/1971 | Bischoff | 73/194 F |
| 3,718,043 | 2/1973 | Fishman et al. | 73/194 F |
| 3,848,460 | 11/1974 | Bantz et al. | 73/597 |

*Primary Examiner*—Charles A. Ruehl
*Attorney, Agent, or Firm*—Schwartz, Jeffery, Schwaab, Mack, Blumenthal & Koch

[57] ABSTRACT

In mass flow rate measuring apparatus wherein the fluid is ionized at intervals at a predetermined point of the fluid passage, a voltage is sensed when the ionized flow mass is collected by an electrode located downstream from the ionization point. Electromagnetic radiation, generated in response to the generation of a strong electric field that ionizes the fluid, is prevented by means of a gate circuit from being sensed as a signal for triggering a time measuring device. The signal from the gate circuit is coupled to a voltage sensing circuit that detects a point near or at the peak value of successive voltage waveforms to signal the time measuring device as a point of ion collection.

7 Claims, 7 Drawing Figures

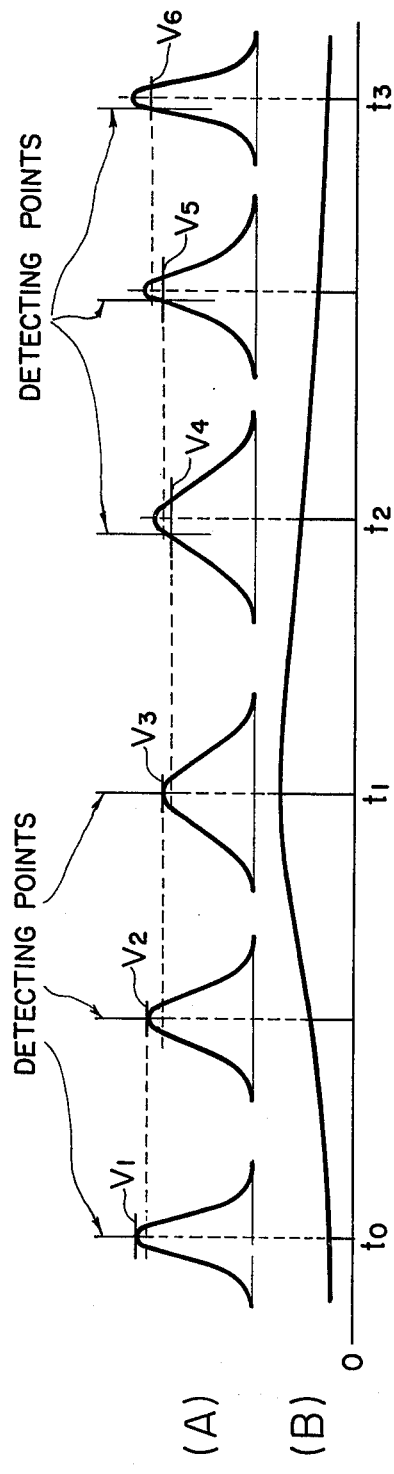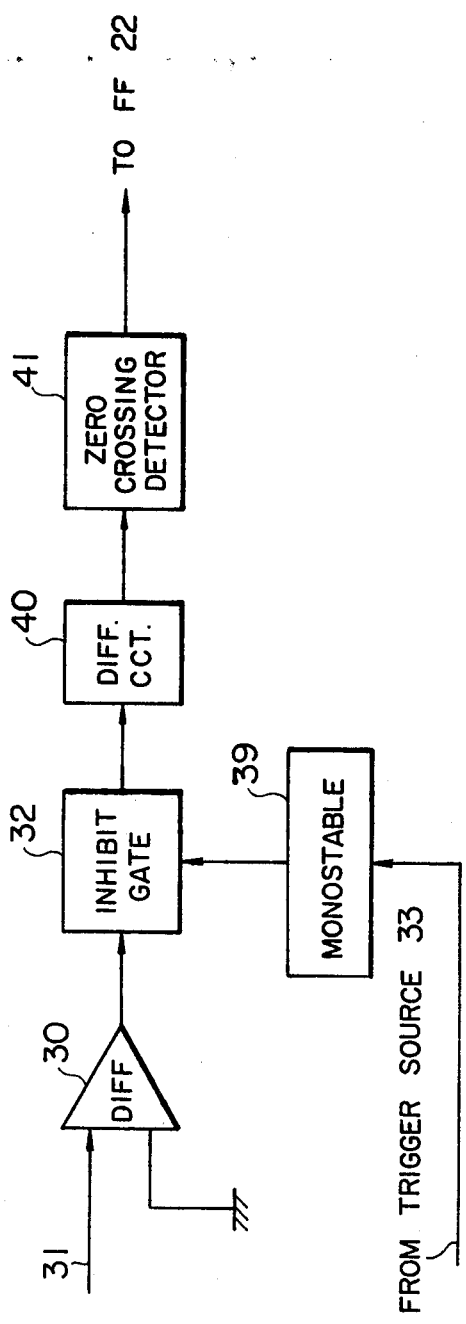

PEAK POINT DETECTOR FOR IONIZED MASS FLOW RATE MEASUREMENT

BACKGROUND OF THE INVENTION

The present invention relates to mass flow measuring apparatus in which fluid is ionized in succession at a particular point of a fluid passage and then detected at a known distance from the ionization point, the elapse of time between the ionization and detection being a measure of the flow rate.

Ionization of fluid is known in the art as an accurate means of measuring mass flow rate if the ionization interval is rapid enough for the changing rate of the fluid flow. Because of the fast response characteristic, such ionization methods are particularly useful for metering input data for accurate control of air-fuel mixture for emission reduction purposes, such as closed-loop controlled internal combustion engines. However, due to the high intensity electric field required for generating corona discharges, electromagnetic radiation is also generated in response to the generation of a corona discharge. This radiation would be sensed as a signal to trigger the measurement if no provisions are made. Furthermore, the electrical signal provided by the charge detecting electrode has a different magnitude and waveshape depending on the flow rate so that the detecting time tends to vary between different waveshapes resulting in an erroneous flow rate measurement.

SUMMARY OF THE INVENTION

A principal object of the invention is to provide accurate measurement of mass flow rate.

Another object of the invention is to provide an ionized flow rate measuring apparatus which is immune to errors arising from unwanted false signals and different voltage waveshapes.

According to the invention, an ion detector includes a gate circuit connected to a charge collecting electrode disposed in a fluid passage. The gate circuit is normally operative to pass the signal from the collecting electrode and inhibit the passage for a short interval from the time of generation of an ionized fluid mass. This prevents the passage of a false trigger signal due to electromagnetic radiation produced in response to a corona discharge. The radiation-error free signal is applied to a voltage sensing circuit which detects a predetermined point of the waveform of the voltage signal provided by the collecting electrode. The passage of time between the time of generation of an ionized flow mass and the detection of the ionized mass flow is divided by the distance between the points of ion generation and detection to derive mass flow rate.

In one embodiment, the voltage sensing circuit includes a peak detector which senses the maximum peak values of the voltage waveform and stores the detected peak for an interval between successive ionizations. The stored peak value is then scaled down to a level appropriate as a reference for comparison with the instantaneous value of the subsequent waveform. Since the waveform and its peak value varies with the flow rate, the point of detection can be accurately determined by varying the threshold in accordance with a value corresponding to the peak of the previous waveform. If the period between successive ionizations is so selected that there is likely no more than a change of 10% of the previous peak value, for example, the stored peak value is scaled down to its 90% value, or the complementary value of the change rate. The point of detection can thus be set at or near the peak value of successive voltage waveforms.

BRIEF DESCRIPTION OF THE DRAWINGS

These and other objects and advantages of the invention will become apparent from the following detailed description when taken in conjunction with the accompanying drawings, in which:

FIGS. 3A and 3B are waveforms appearing in the circuit of FIG. 2 useful for explanation of the detection of successive voltage waveforms;

FIG. 4 is a schematic diagram of a modification of FIG. 2;

DESCRIPTION OF THE PREFERRED EMBODIMENTS

Figure 1:
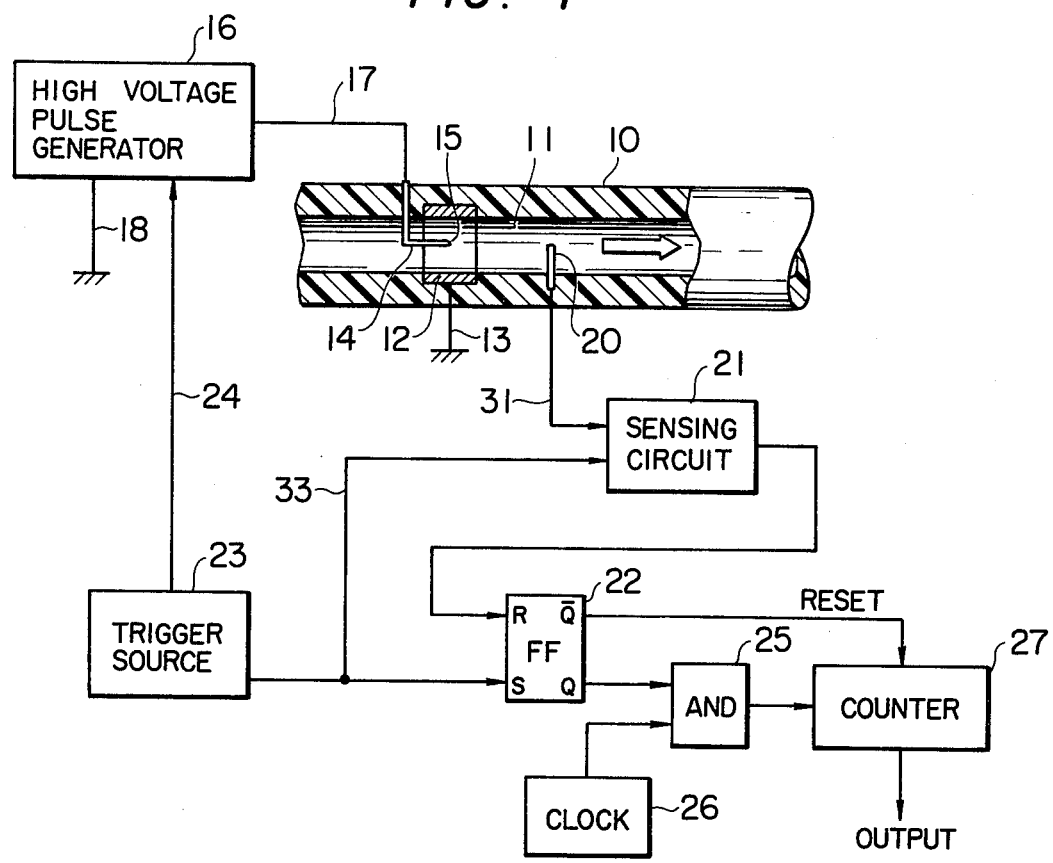
FIG. 1 is a schematic diagram of the mass flow rate measuring apparatus of the invention.

The apparatus of the invention is shown in FIG. 1 in which fluid is directed to pass through a passage 11 of a hollow cylindrical structure or pipe 10 which is constructed of an electrically nonconductive material. Ionizing means is provided which is formed by two electrodes: a ring or cylindrically hollow outer electrode 12 and a cylindrical rod or inner electrode 14 having a reduced diameter portion 15. The ring electrode 12 is embedded in the inner wall of the conduit 10 and connected electrically to a first terminal of a high voltage pulse generator 16 or ground by conductors 13 and 18. The cylindrical rod 14 is disposed concentrically with the center axis of the ring electrode 12 and connected electrically to the second terminal or output of the pulse generator 16 by conductor 17. An ion collecting electrode 20 is mounted in the cylindrical structure 10 downstream from the ionizing electrodes 12, 14 and connected electrically to a sensing circuit 21 whose output is connected to the reset terminal of a flip-flop 22. This flip-flop is triggered into a set condition by a signal from a trigger source 23 which also supplies the trigger signal to the pulse generator 16 through conductor 24. The trigger source 23 generates the trigger pulse at regular intervals to provide measurement of the instantaneous values of flow rate in succession.

An AND gate 25 is shown connected to the Q output of the flip-flop 22 to pass clock pulses from clock source 26 to a binary counter 27 which is arranged to be reset by the $\overline{Q}$ output of flip-flop 22. The counter 27 provides digital output representing the transit time of the ionized mass flowing through the passage 11 over the distance between the ionizing electrode 15 and the collecting electrode 20. This digital output is applied to a flow rate indicating circuit (not shown) where the input signal is used to arithmetically divide the known distance between electrodes 15 and 20 to compute an instantaneous value of the flow rate.

The amplitude of the pulse from the pulse generator 16 and the shape and size of the inner electrode 14 are so determined as to establish a corona discharge in the fluid passage 11 so that a portion of the fluid is ionized to produce a cloud of oppositely charged ions. The pulse from generator 16 is of negative polarity because it is found to be advantageous for effecting ionization of the fluid such as gasoline or the like, as compared with the use of positive polarity pulses. As a result, the positively charged ions are rapidly attracted by the negatively biased inner electrode 14, while the negatively charged ions migrate in the form of a space charge or cloud of ions with the fluid flow down the passage 11 until they are collected by the collecting electrode 20. On the other hand, the flip-flop 22 is switched to a first binary state in response to the trigger pulse and AND gate 25 is thus enabled to pass clock pulses to the binary counter 27. Upon the detection of the negatively charged ions by the collecting electrode 20, the flip-flop 22 is switched to a second binary state to reset the counter 27.

It is understood therefore that in response to each of the trigger pulses from the trigger source 23, a cloud of negatively charged ions is produced in the passage 11 and migrates at the same speed as the speed of fluid flow in the passage 11 from the point defined by the ionizing electrode 14 to the point defined by the collecting electrode 20. During the migration of the cloud of ions the counter 27 is activated to produce an output representative of the transmit time of the ions over the known distance between the two defined points. Since the cloud of ions migrates at the same speed as the fluid flow, the digital output from the counter 27 is a measure of the instantaneous value of the mass flow rate.

Figure 2:
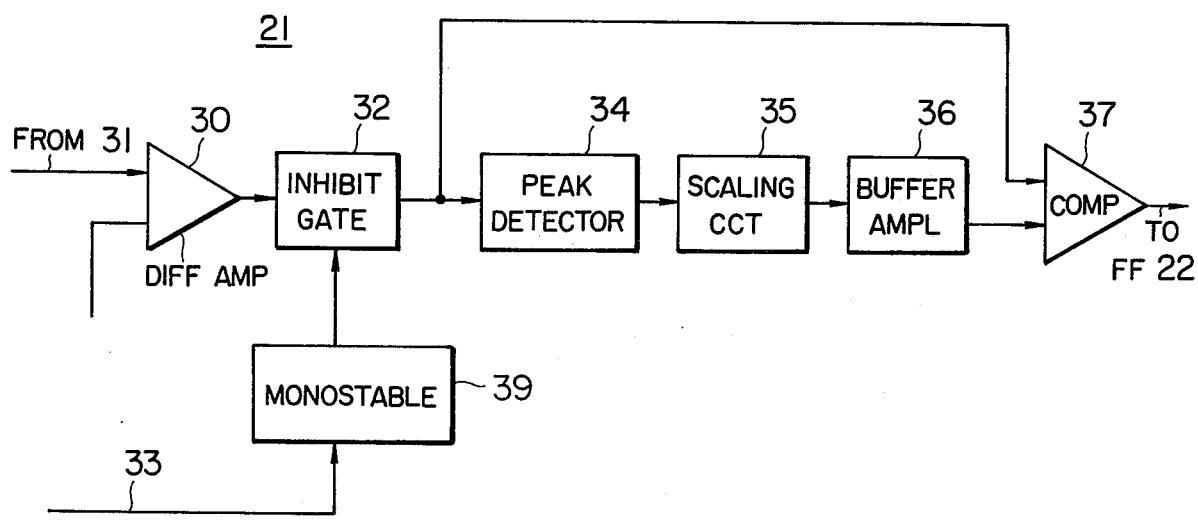
FIG. 2 is a schematic diagram of a sensing circuit of FIG. 1.

According to the invention, the sensing circuit 21 comprises, as illustrated in FIG. 2, a differential amplifier 30 which receives the signal from the collecting electrode 20 on lead 31 to supply an amplified signal to an inhibit gate 32. This gate is normally conductive to pass the amplified signal to a peak detector 34 and becomes nonconductive in response to the output from a monostable multivibrator 39 which is turn is connected to receive the trigger pulse from source 23 on lead 33. The monostable 39 provides a constant duration pulse during which the gate 32 is turned off to prevent the passage of differential output. The effect of this inhibit operation is to prevent the passage of false signals arising from electromagnetic radiation produced in response to the generation of a corona discharge.

The peak detector 34 senses the peak values of the voltage waveform representation of the negatively charged ions which have different dispersion depending on flow rates. The detected peak values are held over a decay period such that the output of the peak detector is representative of the most recent peak value of the sensed signal or voltage excursion of the peaks. Since the charge cloud tends to be dispersed by the fluidic flow, the sensed voltage has a different waveshape depending on the flow rate. Specifically, the charge is less affected by the fluidic flow when the latter is at lower flow rates, so that the voltage waveform has a higher peak value for low flow rates than it has for higher flow rates.

A scaling circuit 35 is shown connected to the output of peak detector 34 to scale down the detected peak value so that it delivers 90% of the input signal. This scaled down voltage is coupled via a buffer amplifier 36 to a comparator 37 as a reference threshold for comparison with an amplified signal from differential amplifier 30. Therefore, the instantaneous value of the sensed signal is compared with the 90% value of the peak of the previously generated ion cloud.

It is to be noted that the triggering rate is so determined that the voltage peaks of successive waveforms do not vary as much as 10% or more by taking into account the flow rate. The reference voltage as supplied from the scaling circuit 35 is used as a variable reference that varies as much as 10% or less between successive peak values so that the reference level coincides with the peak value of the next waveshape as the flow rate increases as illustrated in FIGS. 3A and 3B. Therefore, the comparator 37 will produce an output when the peak value of the next waveshape reaches the threshold so that the peak level of the successive voltage waveforms can be detected so long as the successive peaks decrease with time for a time interval between times $t_0$ to $t_1$. When the peak values increase during time interval from $t_2$ to $t_3$, the 90% value of the preceding voltage waveform corresponds to a level slightly below the peak value of the next waveform so that the threshold is detected slightly prior to the occurrence of each peak. Although there is a slight difference in detecting points between the waveforms appearing in a time interval when flow rate is on the increase and those appearing in a subsequent interval when flow rate is on the decrease, the use of a variable threshold is advantageous for detecting a valid instant of charge collection as compared with the use of a fixed threshold which is employed in the prior art.

A modification of the embodiment of FIG. 3 is illustrated in FIG. 4 which is generally similar to the previous embodiment with the exception that a differentiating circuit 40 and a zero crossing detector 41 are connected in a series circuit between the inhibit gate 32 and the reset input of flip-flop 22. The voltage waveform of the collected charge ions is differentiated by the differentiator so that the peak point of the waveform corresponds to the zero crossing point of the differentiated signal which is detected subsequently by the detector 41. Detector 41 may be any of the conventional design which is constructed of a comparator that compares the differentiator output with the zero reference level. The detected peak values are sent to the reset terminal of the flip-flop 22.

With a circuit arranged in the configuration just described, the flip-flop 22 is triggered into a set condition in response to the generation of negatively charged ions and subsequently reset into the original binary state in response to the detection of a point near or at the peak point of the waveform of the charges collected downstream of the point of charge generation, without the adverse effect of the electromagnetic radiation generated simultaneously with the generation of ions. The output of the flip-flop 22 is thus an accurate representation of the transit time of the fluid passing through the conduit 10 over the known distance.

Figure 5:
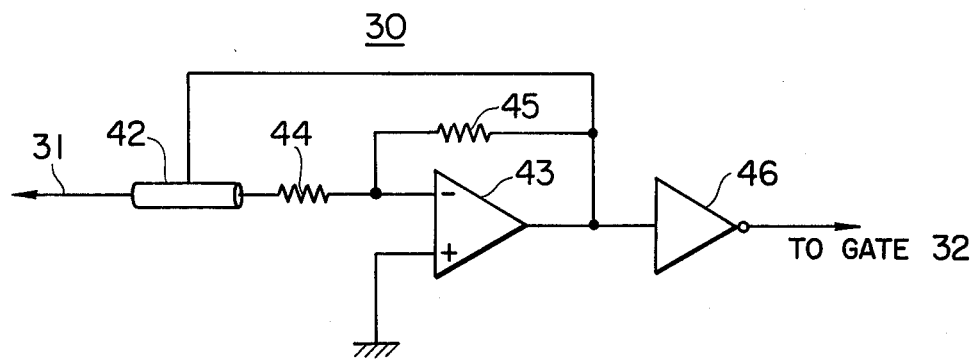
FIG. 5 shows an amplifier circuit used in the sensing circuit of FIGS. 2 and 4.

FIG. 5 illustrates a circuit which is useful for suppressing noise introduced to the connection between the charge collecting electrode 20 and the sensing circuit 21. In FIG. 5, the conductor 31, connected between the electrode 20 and sensing circuit 21, is electrically shielded by a shield tube 42 which is connected to the output of an operational amplifier 43 having its noninverting input connected to ground and its inverting input connected by way of a resistor 44 to the conductor 31. The amplifier output is connected by a feedback resistor 45 to its inverting input to form a differential amplifier configuration. With this circuit configuration, the output terminal of the amplifier 43 has a very low impedance value so that the shield 42 is substantially connected to ground. Furthermore, the shield 42 is biased with a voltage of opposite polarity to the voltage on conductor 31 so that the apparent capacitance of the shielded conductor 31 is reduced and noise is cancelled out at the output of the differential amplifier 43. The output of the amplifier 43 is connected to the inhibit gate 32 by way of a buffer amplifier 46.

Figure 6:
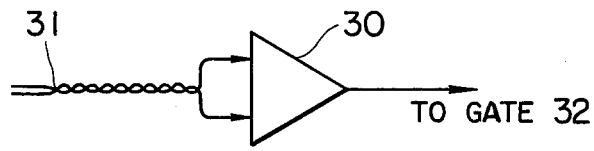
FIG. 6 is an illustration of the input circuit of a differential amplifier of FIG. 2.

The noise cancelling effect can also be accomplished by use of a twisted pair of wires instead of the shielded conductor as shown in FIG. 6.

Figure 7:
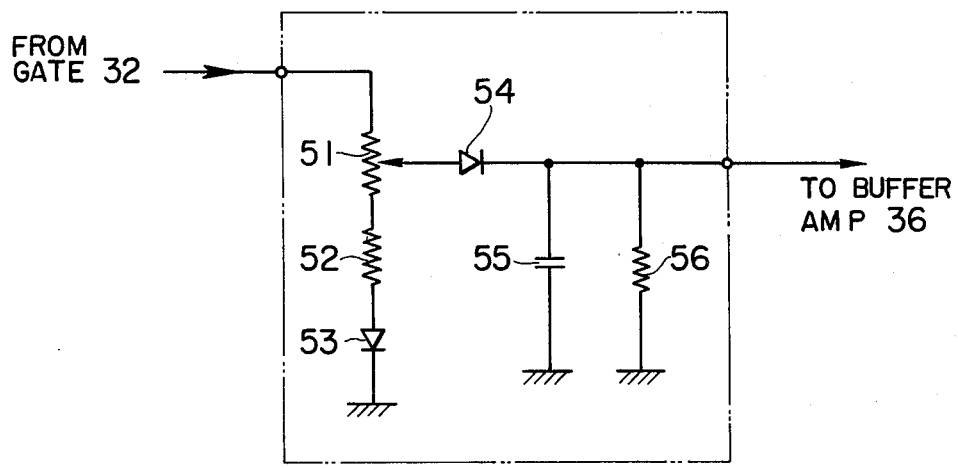
FIG. 7 is an illustration of details of peak detector and scaling circuit of FIG. 2.

FIG. 7 is an illustration of details of peak detector 34 and scaling circuit 35 of FIG. 2. The output from the inhibit gate 32 is supplied to a voltage divider formed by potentiometer 51, a resistor 52 and a diode 53. The diode 53 permits current to pass through the resistors 51, 52 to ground to develop a voltage at the wiper terminal of resistor 51. This voltage is coupled by a diode 54 to an RC circuit formed by a capacitor 55 and a resistor 56 connected in a parallel circuit between the cathode terminal of diode 54 and ground. The capacitor is thus charged to a voltage at the potentiometer 51 and discharged through resistor 56. The diode 54 prevents the capacitor 55 from being discharged through the voltage divider. Voltage scaling is thus accomplished by adjusting the potentiometer 51 to an appropriate value, and the scaled down peak value of the input waveform is stored on the capacitor 55.

What is claimed is:

1. Apparatus for measuring the mass flow rate of fluids passing therethrough, comprising in combination:
    means for periodically ionizing the fluid to generate a series of charged ions;
    means located downstream from the ionization means for collecting the ions to generate a corresponding electrical signal having a different waveform depending upon the flow rate of said fluid;
    gating means connected to the ion collecting means and normally operable to pass said electrical signal and prevent the passage of said signal for a predetermined duration in response to the ionization of said fluid;
    voltage sensing means connected to said gating means for detecting a point near or at the peak value of said electrical signal waveform; and
    means responsive to the time of ionization of said fluid for generating a first voltage level signal and responsive to the detection of said point of the electrical signal waveform for generating a second voltage level signal, whereby the presence of said first voltage level signal represents the transit time of said charged ions between two predetermined spaced apart points.

2. Apparatus as claimed in claim 1, wherein said voltage sensing means comprises a peak detector for detecting the maximum values of said electrical signal waveform and storing the detected maximum value for the interval between successive ionizations, scaling means for generating a voltage proportioned with respect to the detected maximum value of said waveform, and means for comparing the instantaneous values of said electrical signal waveform with said proportioned voltage of said signal waveform generated in response to a previous ionization to generate an output signal when the instantaneous value of the subsequent waveform reaches the proportioned voltage of the maximum value of the previous waveform, the occurrence of said output signal representing said detected point.

3. Apparatus as claimed in claim 2, wherein said voltage sensing means comprises a buffer amplifier connected between said scaling means and said comparing means.

4. Apparatus as claimed in claim 1, wherein said voltage sensing means comprises a differentiating circuit for providing a differentiation of said electrical signal waveform and a zero crossing detector for detecting when said differentiated signal is at or near a zero voltage level to represent said detected point.

5. Apparatus as claimed in claim 1, wherein said voltage sensing means comprises a differential amplifier having positive and negative input terminals receptive of said electrical signal waveform for cancelling noise introduced to said waveform.

6. Apparatus as claimed in claim 5, comprising a pair of conductors, one of which is interconnected between said ion collecting means and one of said input terminals of said differential amplifier and the other of which surrounds said one conductor and connected to the output of said differential amplifier.

7. An ion detecting device for mass flow measuring apparatus including means for ionizing fluids at periodic intervals at a predetermined point of a fluid passage and time measuring means responsive to the ionization and the detection of said ionized fluid, comprising:
    a charge collecting electrode in said passage located at a known distance downstream from said predetermined point to produce an electrical signal in response to the proximity thereto of an ionized flow mass;
    gating means normally operative to pass said electrical signal and prevent the passage of said signal for a short interval from the time of said ionization; and
    voltage sensing means responsive to the signal passing through said gating means for detecting a predetermined point of the waveform of said electrical signal for signaling said time measuring means as a point of detection of said ionized flow.

* * * * *